United States Patent [19]
Pierret

[11] Patent Number: 6,081,103
[45] Date of Patent: Jun. 27, 2000

[54] METHOD FOR REGULATING THE EXCITATION CURRENT IN A MOTOR VEHICLE ALTERNATOR BY DIGITAL PROCESSING, AND A REGULATING DEVICE FOR CARRYING OUT THE METHOD

[75] Inventor: Jean-Marie Pierret, Paris, France

[73] Assignee: Valeo Equipements Electriques Moteur, Creteil, France

[21] Appl. No.: 08/837,969

[22] Filed: Apr. 15, 1997

[30] Foreign Application Priority Data

Apr. 18, 1996 [FR] France .................................. 96 04856

[51] Int. Cl.⁷ ....................................................... H02J 7/24
[52] U.S. Cl. .............................. 322/36; 322/28; 322/25; 318/439
[58] Field of Search .................................. 322/20, 25, 27, 322/28, 29, 33, 34, 36; 290/46, 49; 318/439

[56] References Cited

U.S. PATENT DOCUMENTS

| | | | |
|---|---|---|---|
| 4,602,205 | 7/1986 | Matsuhashi et al. | 320/64 |
| 4,673,862 | 6/1987 | Wahlstrom | 320/64 |
| 5,079,496 | 1/1992 | Pierret et al. | 322/28 |
| 5,157,321 | 10/1992 | Karo et al. | 322/28 |
| 5,296,798 | 3/1994 | Pierret et al. | 322/28 |
| 5,444,354 | 8/1995 | Takahasi et al. | 322/28 |
| 5,521,485 | 5/1996 | Vogelsberger | 322/28 |
| 5,548,202 | 8/1996 | Schramm et al. | 322/33 |

FOREIGN PATENT DOCUMENTS

| | | |
|---|---|---|
| 0 417 782 | 3/1991 | European Pat. Off. . |
| 0 481 862 | 4/1992 | European Pat. Off. . |

OTHER PUBLICATIONS

Patent Abstracts of Japan, vol. 014, No. 066 (P–1003), Feb. 7, 1990 and JP–A–01 287703 (NKK Corp), Nov. 20, 1989.
French Search Report dated Jan. 10, 1997.

*Primary Examiner*—Nestor Ramirez
*Assistant Examiner*—Nicholas Ponomarenko
*Attorney, Agent, or Firm*—Morgan & Finnegan, L.L.P.

[57] ABSTRACT

The excitation current in the rotor winding of a motor vehicle alternator is regulated by this method. The alternator produces a rectified output voltage to be regulated, this output voltage being a periodic voltage having a period T consisting of a first phase $T_1$ in which the battery voltage is applied to the rotor winding, and a second phase $T_2$ in which the battery voltage is not applied to the rotor winding. The method includes: measuring the rectified voltage by sampling during each period T; comparing the measured value with a calculated reference value; and deducing from this comparison three numerical values. The first of these corresponds to the difference between the measured value of the rectified voltage and the reference value. The second of these numerical values is a closed loop excitation value calculated in each period T by adding the corresponding value measured in the preceding period to the first numerical value, to which a first correcting factor is applied. The third numerical value is an open loop excitation value calculated, in each period T, by adding together the closed loop excitation value already calculated in the same period and the first numerical value, to which a second correcting factor is applied. The duration of the first phase of the rectified voltage is determined by the value of the open loop excitation.

8 Claims, 5 Drawing Sheets

METHOD FOR REGULATING THE EXCITATION CURRENT IN A MOTOR VEHICLE ALTERNATOR BY DIGITAL PROCESSING, AND A REGULATING DEVICE FOR CARRYING OUT THE METHOD

FIELD OF THE INVENTION

The present invention relates to a method for regulating the excitation current of a motor vehicle alternator by digital processing, and a regulating device for carrying out such a method.

BACKGROUND OF THE INVENTION

As is well known, an alternator is an electrical machine in which an alternating current is generated in its stator windings under the effect of inductor or rotor winding, through which an excitation current flows when the rotor winding is put into rotation. At the output of the stator windings, a diode bridge rectifies the alternating current so as to deliver a unidirectional, or direct current, voltage to the battery of the vehicle.

The rectified voltage has to be regulated in such a way as to remain constant regardless of the speed of rotation of the alternator, and regardless of the load on the battery. The output voltage of the alternator thus has a regulation waveform which reflects the excitation current, this waveform having a period T. The period T comprises a first phase $T_1$ and a second phase $T_2$ alternating with each other, i.e. having opposite signs whereby the amplitude increases in one phase and decreases in the other. In the first phase, the battery voltage is applied to the rotor winding, which enables the current flowing in the rotor winding to increase; while in the second phase, the battery voltage is not applied to the rotor winding, and this reduces the current in the rotor winding. The ratio $T_1/(T_1+T_2)$ is called the cyclic ratio.

It has previously been proposed to carry out the regulation of the rectified voltage output from the alternator using digital techniques. For example, European patent specification No. EP 0 481 862 describes a procedure for regulation by digital processing, in which the output voltage of the alternator is measured at each period T by sampling.

The numerical value of the measured temperature is then compared with a reference value; and from this comparison, the value of the alternating phases $T_1$ and $T_2$ in the next following period are deduced by modifying the cyclic ratio of a value directly proportional to the difference between the measured output voltage and the reference voltage.

A problem arises in the choice of the value that modifies the cyclic ratio. In this connection, if the duration of the excitation pulse in the phase $T_1$ is short, and if this is followed by a severe increase in the load applied to the alternator, it is then desirable, in order to enable the system to react quickly, to increase very rapidly the duration of the successive excitation pulses $T_1$. The purpose of this is to be able to make a large modification to the value of the cyclic ratio. This makes it necessary to multiply the difference between the measured voltage and the reference voltage by a high correcting factor.

On the other hand, in that case, the least variation between the measured voltage and the reference voltage will be repeated very severely on the excitation pulse. This leads to instability in the voltage regulation.

DISCUSSION OF THE INVENTION

An object of the present invention is to overcome the above drawbacks, by providing a method of regulation which enables the system to react rapidly while at the same time ensuring that the voltage regulation is stable.

According to the invention, a method of regulating the excitation current of a rotor winding of an alternator for a motor vehicle, the said alternator including, in particular, a rectifier bridge for delivering a rectified output voltage to be regulated by the said method, the rectified voltage having a waveform comprising a low frequency component produced by a variable amplitude excitation signal, the said rectified voltage being therefore a periodic voltage, each period T of which is divided into a first phase $T_1$ of one sign, during which the voltage from the battery of the vehicle is applied to the rotor winding, and a second phase $T_2$ of the opposite sign, during which the voltage of the battery is not applied to the rotor winding, wherein the said method comprises the steps of:

measuring the rectified voltage by sampling, that is to say by performing successive measurements close to each other, and comparing the measured value of the recitifed voltage with a calculated reference value, is characterised in that the following are deduced from this comparison:

a first numerical value corresponding to the difference between the measured value of the rectified voltage and the reference value;

a second numerical value, called a closed loop excitation, which is calculated, for each period T, by adding to the value of the closed loop excitation in the preceding period the first numerical value, to which a first correcting factor is applied; and a third numerical value, referred to as an open loop excitation, which is calculated, in each period T, by adding to the value of the closed loop excitation previously calculated during the same period T the first numerical value, to which a second correcting factor is applied, the said third numerical value determining the time $T_1$ during which the battery voltage is applied to the rotor winding of the alternator.

According to a preferred feature of the invention, the second correcting factor is a number the value of which is greater than that of the first correcting factor.

Thus, in the method of the invention two separate variables are used, namely the open loop excitation and closed loop excitation. The open loop excitation determines the duration of the excitation phase $T_1$, and it changes rapidly, which enables the system to respond rapidly to a sudden load increase. By contrast, the closed loop excitation changes by a much smaller amount as between one period T of the voltage and the next, and, in each of these periods, it serves as the basis for calculation of the open loop excitation. This provides the required stability, even when the regulation is changing rapidly.

According to another preferred feature of the invention, a test is carried out when the second numerical value of closed loop excitation has been calculated, and if the said value of closed loop excitation is equal to the duration of the period T, then the third numerical value of open loop excitation is equal to the period T. This feature enables the calculation of open loop excitation to be omitted when the system is in a "full field" condition, that is to say when the excitation voltage is applied to the rotor winding for the whole of the period T.

Preferably, the reference value is computed as a function of at least one parameter associated with the alternator and/or with the battery of the vehicle.

Preferably, the reference value is calculated as a function of the temperature of the alternator and/or of the battery.

According to yet another preferred feature of the invention, the method of regulation comprises:

carrying out during each period T a measurement of temperature, and deducing therefrom a reference value, which is a function of the measured temperature, the said reference value being then compared with the measured value of the rectified voltage.

According to a still further preferred feature of the invention, the reference value is calculated, from a value predetermined for a given temperature, by applying to the said predetermined value a correcting factor which is a function of the temperature.

Further features and advantages of the invention will appear more clearly on a reading of the following detailed description of a preferred embodiment of the invention, which is given by way of non-limiting example only and with reference to the accompanying drawings.

DESCRIPTION OF A PREFERRED EMBODIMENT OF THE INVENTION

Figure 1:
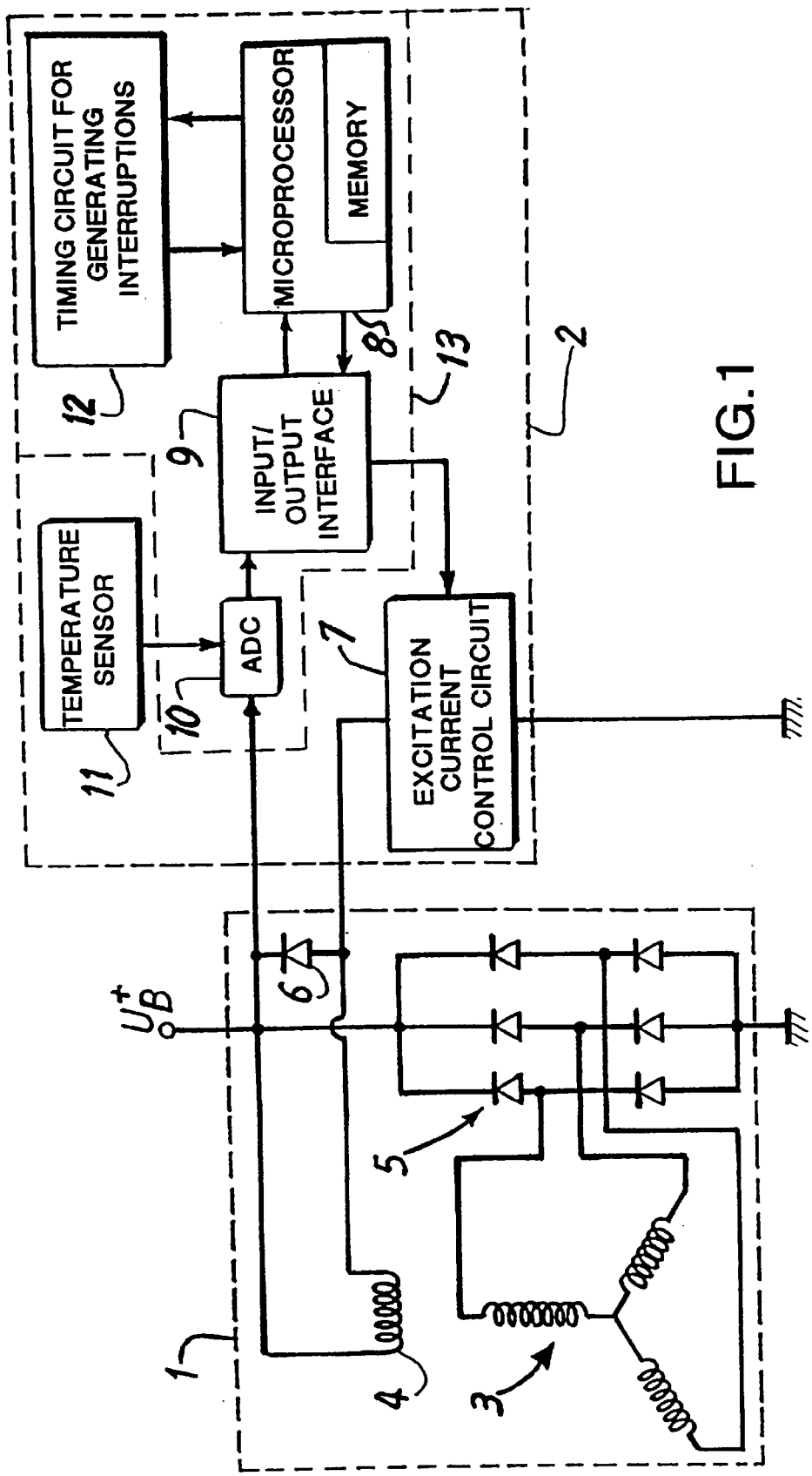
FIG. 1 is a block diagram of a regulating device in accordance with the invention.

Reference is first made to FIG. 1, which shows an alternator 1 having stator windings 3, in which an alternating voltage is generated by a rotor winding 4 or inductor. A diode bridge 5 is connected to the output of the stator windings 3 so as to deliver a rectified voltage $U_B^+$, which is applied to the battery and to the onboard wiring network of the vehicle.

The excitation current flowing through the rotor winding 4 is regulated by a regulating device 2, which includes an excitation current control circuit 7. The control circuit 7 consists for example of a power transistor which passes an excitation current when in the passing state. When the power transistor is blocked, it prevents the rotor winding 4 from being supplied with any voltage by the battery of the vehicle. A diode 6, connected in parallel with the rotor winding 4, ensures the circulation of the current in the rotor winding during those phases in which the rotor winding is no longer energised by the battery.

The regulating device 2 also includes a microcontroller 13 which comprises circuits 8, 9, 10 and 12. The circuit 8 is a microprocessor having a memory. The microprocessor 8 performs the various calculations and processing steps necessary for the voltage regulation. The circuit 9 is an input and output interface for the microprocessor. The circuit 10 is an analogue/digital converter, which converts the alternator output voltage $U_B^+$ into a set of octets, and which also converts the voltage, received from a temperature sensor 11 and representing the temperature of the alternator 1 or of the battery, into a digital value.

Finally, the circuit 12 is a timing circuit, which causes interruptions to occur in order to change the state of excitation of the rotor winding 4. The timing circuit 12 contains data calculated by the microprocessor 8. The temperature sensor 11 is part of the regulating device 2.

Reference is now made to FIG. 2A, in which the voltage $U_B^+$ to be regulated is shown as it appears at the output of the alternator or on the wiring network of the vehicle, with time being indicated on the abscissa and the voltage on the ordinate. The voltage $U_B^+$ has a high-frequency waveform 20, which is due in particular to the diode bridge 5 rectifying the voltage $U_B^+$. A wave 21, having a much lower frequency, is superimposed on the wave 20. The wave 21 varies in amplitude as a function of the variations in the excitation current in the rotor winding 4. Thus, the mean value of the voltage $U_B^+$ oscillates about a mean voltage 22.

In conjunction with FIG. 2C, which shows the excitation voltage applied to the rotor winding 4 as a function of time, the low-frequency wave 21 has a period T which consists of two alternating phases $T_1$ and $T_2$. During the phase $T_1$, a square pulse appears in FIG. 2C, signifying that an excitation voltage is applied to the rotor winding 4, which causes the voltage $U_B^+$ to increase as can be seen in FIG. 2A. On the other hand, during the phase $T_2$ no excitation voltage is applied to the rotor winding, so that in FIG. 2C the level is zero, and this causes the voltage $U_B^+$ to decrease as shown in FIG. 2A.

The cyclic ratio $T_1/(T_1+T_2)$ may in theory vary from 0 to 100% according to the demands of the load circuits of the vehicle, and according to the state of charge of the battery.

In methods according to the present invention, the cyclic ratio, or more exactly the duration of the phase $T_1$ of the cycle, is calculated by using two variables: a first variable EXF, which is called closed loop excitation, and a second variable EXO which is called open loop excitation. Referring therefore to FIG. 2C, it can be seen that the variable EXO is the one which determines the length of the phase $T_1$, that is to say the time during which an excitation voltage is applied to the rotor winding of the alternator. This variable changes rapidly from one period T of the cycle to the next. The second variable, the closed loop excitation EXF, is used, as will be seen below, as an intermediate for calculation purposes, and it changes much less rapidly over time, which guarantees good stability in the voltage regulation process.

FIG. 2B shows rectangular pulses $T_e$ which correspond to the time period during which the voltage $U_B^+$ is measured by sampling in the course of each period T. The sampling period $T_e$ is timed to occur in the later part of each period T, regardless of the cyclic ratio, in such a way that the sampling period terminates at an instant which occurs very shortly before the end of the period T. This very short time period from the end of the sampling period $T_e$ to the end of the period T is denoted $\epsilon$. The time $T_e$ is equal to one half of the length of a period T.

Thus, measurement of the voltage $U_B^+$ is reliable, because it lasts for a half period, and the fact that it occurs at the end of the period T gives a rapid response time for the regulating device 2.

All of these operations are carried out by a program which is generated by the microcontroller 13. Thus, referring to FIG. 2D, this shows that an interruption $I_1$, produced by the timing circuit 12, initiates an excitation pulse which can be seen in FIG. 2C, and which prevails over the whole of the period $T_1$ that is loaded into the timing circuit 12. Once this period $T_1$ has elapsed, the timing circuit 12 produces another interruption $I_2$, which causes the excitation to switch to zero for the whole of the period $T_2$.

In the remainder of this description, the sequence of operation of the method for regulation of the voltage will be described with reference to the process charts in FIGS. 3 and 4, which show just one example of a way in which the method may be carried out.

Figure 3:
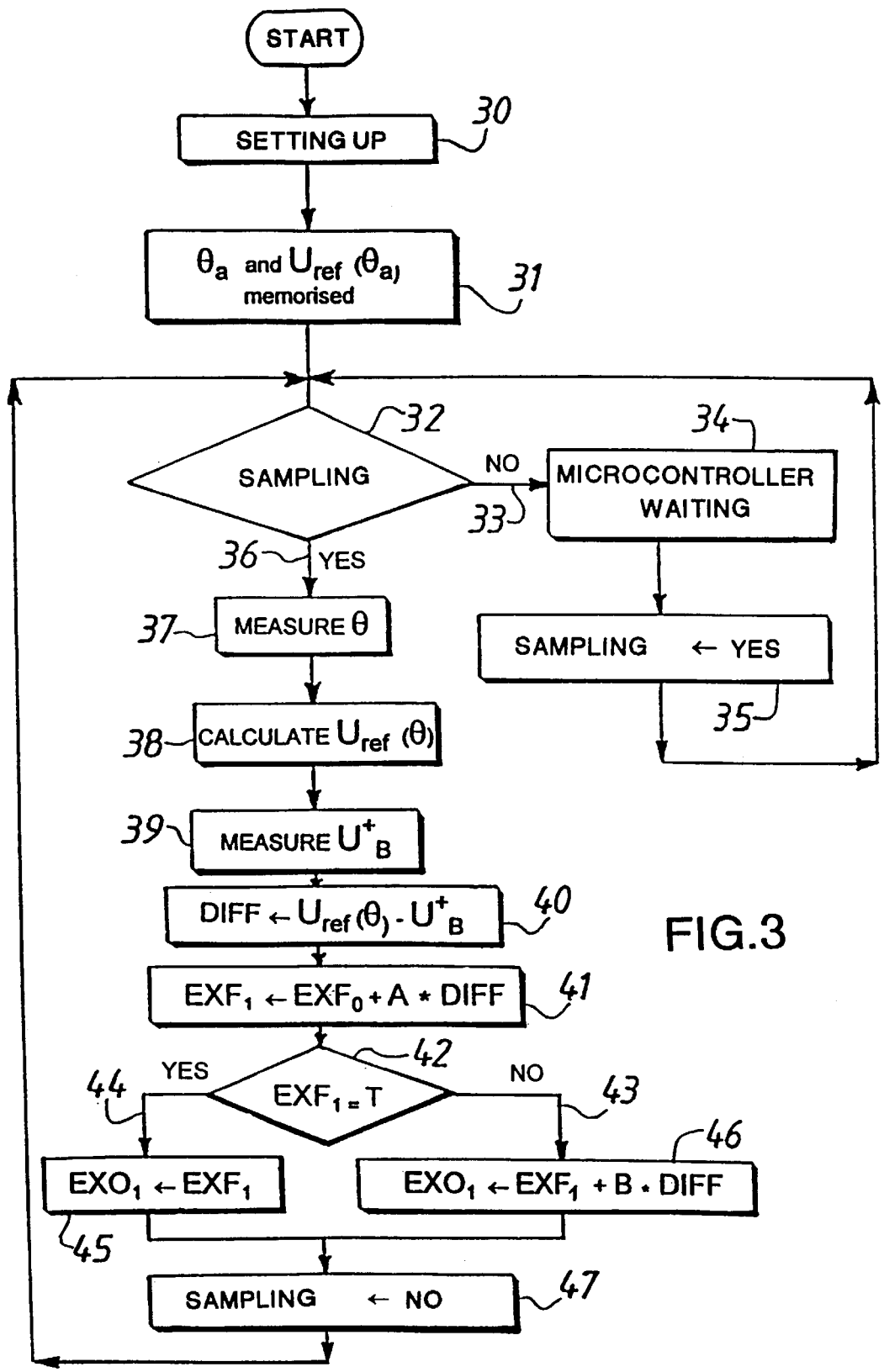
FIG. 3 is a process chart showing steps in the method of the invention.
Figure 4:
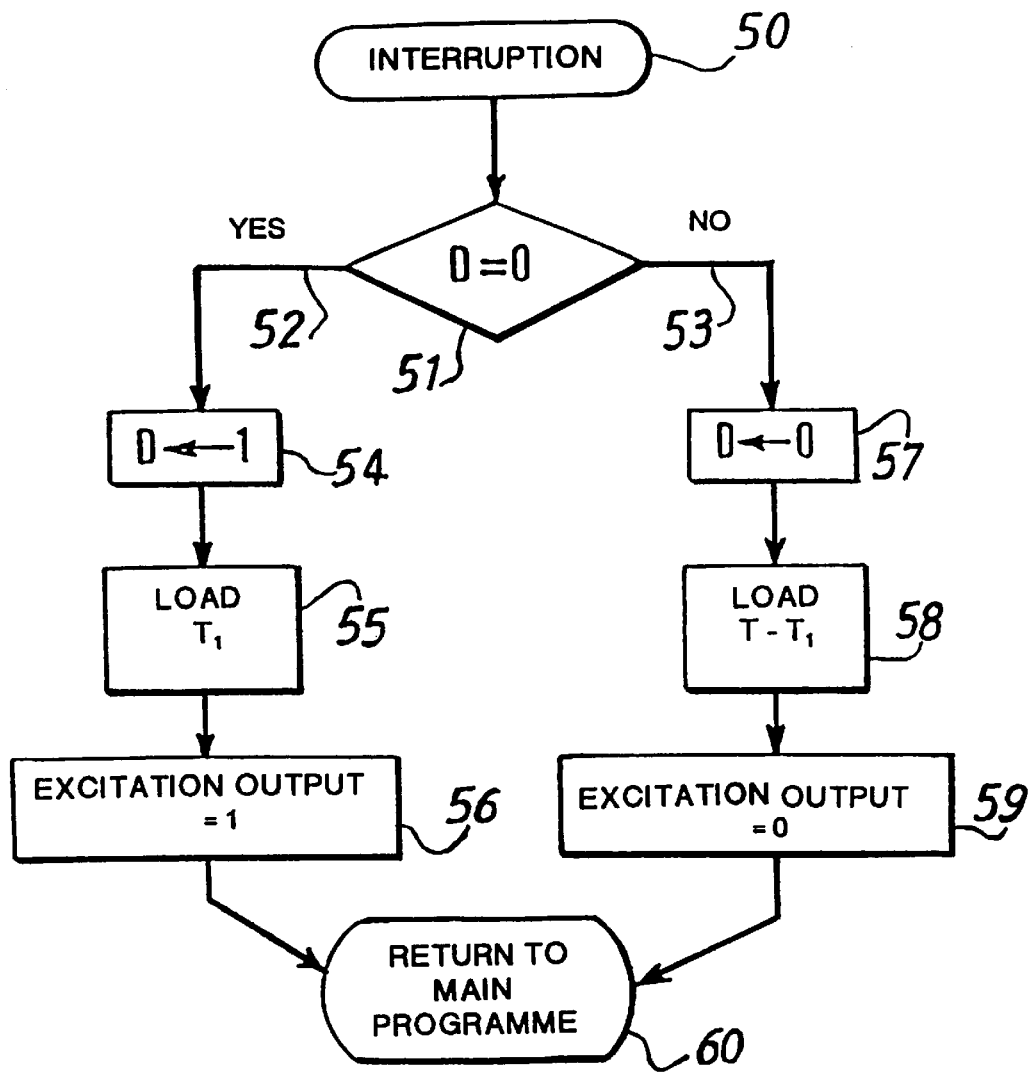
FIG. 4 is another process chart showing steps in the method of the invention.

FIG. 3 shows the main program which is performed by the microcontroller 13, while FIG. 4 shows an interruption program which is carried out at each interruption generated by the timing circuit 12. The duration of each of these interruptions is negligible with respect to that of the other operations performed by the main program of FIG. 3.

In FIG. 3, the main program starts with a setting-up step 30, in which all of the parameters used by the microcontroller 13 and by the timing circuit 12 are initiated. The setting-up step 30 is followed by a memorizing step 31, in which the predetermined values of the temperature $\theta_a$ and the corresponding voltage $U_{ref}(\theta_a)$ are memorized.

For the purposes of describing this program in detail, it is assumed that the instant at which the interruption $I_1$ has just been triggered, initiating an excitation pulse of duration $T_1$, happens at the instant $t_1$.

The sampling indicator has been set at NO during the setting-up step 30 of the program. Then, when the sampling test 32 is performed, it is the output 33 which is selected. The microcontroller then waits, in a step 34, for a time period to elapse, this waiting period having been previously entered into the memory and being less than $T-T/2-\epsilon$. The sampling indicator is then set at YES in a step 35. It should be noted that the waiting period 34 of the microcontroller may be made use of more profitably by carrying out calculations or processing operations which are complementary to each other, and which do not impinge directly on the present invention.

During the new sampling test 32 of the sampling indicator, it is its output 36 which is selected. The following operations are then carried out:

(a) The temperature $\theta$ is measured in a step 37, using information received from the temperature sensor 11 by the analogue/digital converter 10.

(b) The reference value $U_{ref}(\theta)$ of the voltage is computed in a calculation step 38 as a function of the temperature $\theta$ which has been measured; the method of calculation will be explained later herein with reference to FIG. 5.

(c) Once a time period $T-T/2-\epsilon$ has elapsed since the instant $t_1$, measurement of the voltage $U_B^+$ is started in another measuring step 39. This measurement is continued over the whole period $T_e$ by sampling, that is to say that N successive measurements of $U_B^+$ are carried out very close to each other, and these are added and memorized by the microprocessor 8 in the form of a number consisting of two octets.

In a modified version of the method, the operations of measuring the temperature $\theta$ in step 37, and of calculating the reference value $U_{ref}(\theta)$ in step 38, may be performed in step 34.

At the end of the period $T_e$, and during the short time period $\epsilon$, the variables EXF and EXO are calculated, thus enabling a definition to be obtained for the cyclic ratio of the following period:

in a first subtraction step 40, the difference between the measured value of the voltage $U_B^+$ and the reference value $U_{ref}(\theta)$ is memorized in a variable DIFF;

in the next step, 41, the closed loop excitation variable $EXF_1$ is computed as a function of the corresponding variable $EXF_0$ calculated in the preceding period T: for this purpose the value memorised in the previous step in the variable DIFF is multiplied by a coeffficient A, and the result of this computation is added to the variable $EXF_0$ in order to obtain the value $EXF_1$;

in the next step 42, a test is carried out to verify whether the variable $EXF_1$ which has just been calculated is or is not equal to the length of the time period T;

then, if $EXF_1$ is equal to T, the YES output 44 of the test 42 is chosen: the next step is then a step 45 in which the previously calculated value of $EXF_1$, that is to say the value of the period T, is applied to the open loop excitation variable $EXO_1$;

if, on the other hand, the result of the test 42 is negative, the NO output 43 of the test 42 is chosen: the next step is then a step 46, in which the open loop excitation variable $EXO_1$ is calculated by adding to the previously calculated value of $EXF_1$ the value of the variable DIFF multiplied by a coefficient B which is greater than the coefficient A;

then, whatever the result of the test 42, the sampling indicator goes to NO in a step 47, and the system returns to the initial sampling test 32.

The coefficients A and B are numbers, stored in the memory, which have been determined beforehand by carrying out comparative tests. For example, the value of A may be 2, and the value of B may be 4.

Figure 2:
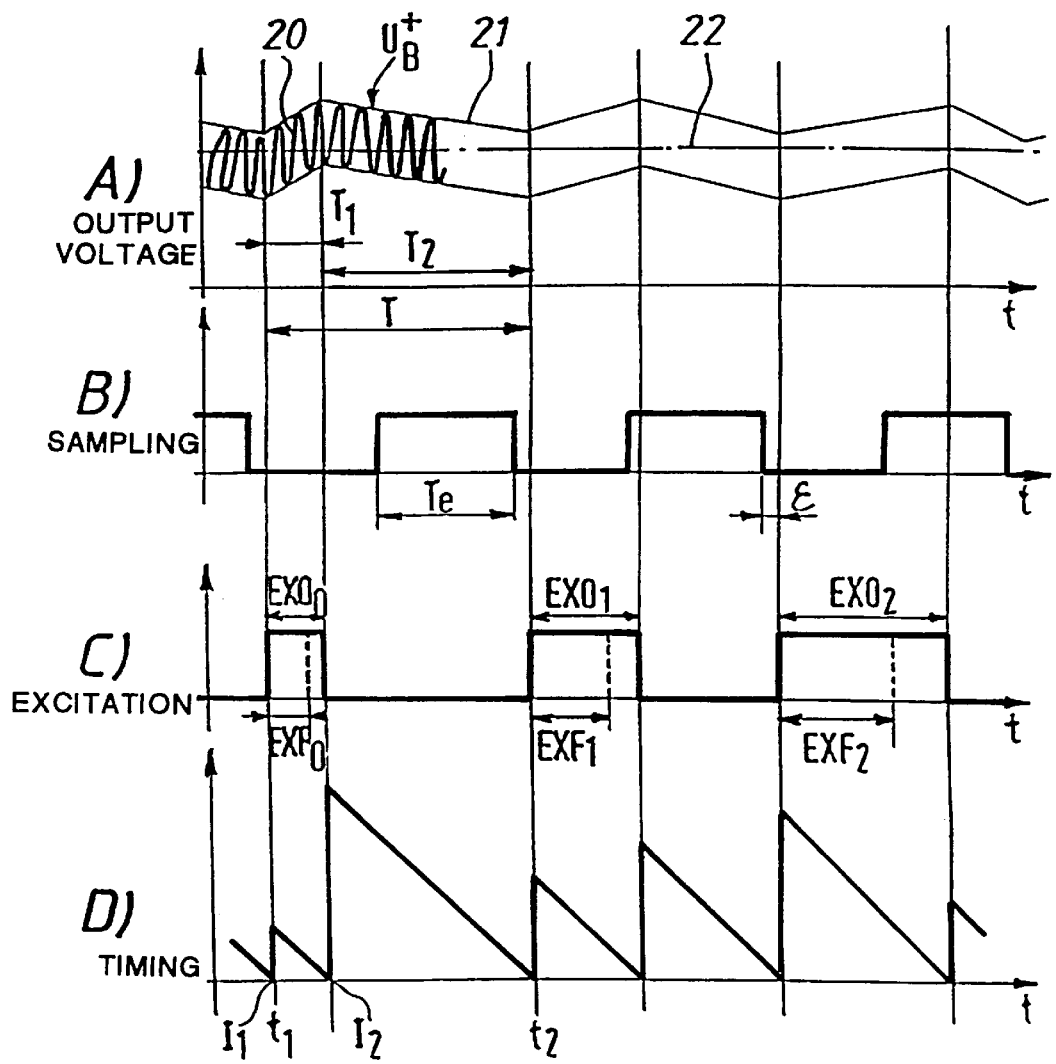
FIG. 2 consists of a set of time diagrams for various electrical signals which illustrate the method of the invention.

The value of $EXO_1$, the computation of which has just been described, defines the duration of the excitation pulse which will be applied in the next period T starting at the instant $t_2$ (see FIG. 2).

The use of the two variables EXF and EXO, computed in different ways, enables the excitation pulse to be increased by a substantial amount where necessary, i.e. when the load on the alternator is increased. This is made possible by the variable EXO: the use of these two variables also provides some degree of stability due to the variable EXF, since the latter changes by a smaller amount as between one period and the next, and still serves as the basis for calculation of the variable EXO.

Referring now to FIG. 4, the interruption program, which is carried out by the microcontroller 13 each time an interruption is produced by the timing circuit 12, will now be described. When such an interruption 50 occurs, a test 51 is carried out to discover the state of an interruption control "flag" D. If the curtain D is at zero, the YES output 52 of the test is then selected. In the next step 54, the value 1 is loaded as soon as possible into the flag D. This is followed by a step 55, in which the value $T_1$, that is to say the value of the variable EXO, which has been calculated by the main program is loaded into the timing circuit 12 so that the latter will produce the next interruption once the time period $T_1$ has elapsed.

In the next step 56, the microcontroller 13 commands the excitation current control circuit 7 to feed the rotor winding 4 of the alternator with an excitation current; that is to say an excitation pulse of period $T_1$, such as those which can be seen in FIG. 2C, is started. After this, the system returns to the main program in a step 60.

Once the excitation period $T_1$ has elapsed, the timing circuit 12 produces a new interruption, and the test 51 is performed again.

Since the flag D is at 1, it is then the NO output 53 of the test 51 that is selected. The value 0 is loaded in a step 57 into the curtain D, after which the value $T-T_1=T_1-EXO$ is loaded into the timing circuit 12 in a step 58, the value of EXO being that which has been computed by the main program. Finally, in a step 59, the excitation current control circuit 7 is commanded to cease supplying current to the alternator rotor winding 4 for the whole of the period T–T$_1$, and the system returns once again, in a step 60, to the main program.

When the period T–T$_1$ has elapsed, a fresh interruption will be produced, and since the flag D is now at 0, the steps 51, 52 and 54 to 56, described above, will then be repeated.

Figure 5:
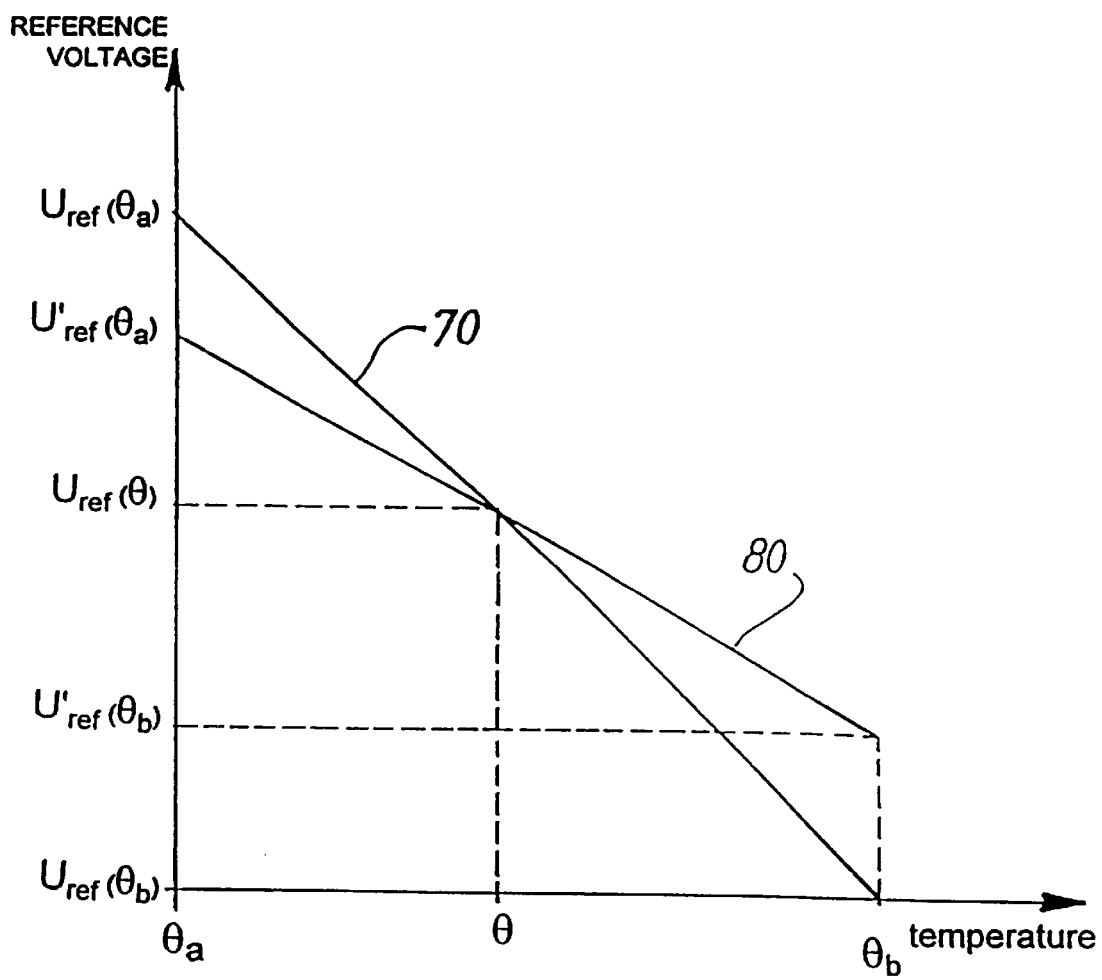
FIG. 5 is a graph in which calculated reference value of the output voltage is plotted against temperature.

Reference is now made to FIG. 5, which shows how the reference value U$_{ref}$(θ) of the rectified voltage is calculated, starting from a reference value U$_{ref}$(θ$_a$) which is predetermined for a given temperature θ$_a$. Starting from this predetermined value, a correcting factor f(θ) is applied. This correcting factor depends on the temperature θ which has been measured, so that:

U$_{ref}$(θ)=U$_{ref}$(θ$_a$)–f(θ).

FIG. 5, the curves 70 and 80 show, respectively, two possible examples of the function –f(θ). If for example f is a linear function that increases with the temperature θ, the graphic representation of –f(θ) is a straight line having a negative slope.

In this example, the curves 70 and 80 are calculated between θ$_a$=–30° C. and θ$_b$=140° C. In the curve 70, U$_{ref}$(θ$_a$)=15.05 volts and U$_{ref}$(θ)=13.35 volts. This enables a thermal compensation of –10 millivolts/C to be obtained, while in the curve 80, U'$_{ref}$(θ$_a$)=14.725 volts, and U'$_{ref}$(θ$_b$)=14.13 volts, which enables thermal compensation of –3.5 millivolts/° C. to be obtained.

Naturally, other forms of thermal compensation may be used instead. In particular, the function f does not necessarily have to be a linear function, but may take any form whatever. Similarly, the reference value of the output voltage could be calculated as a function of other parameters of the alternator, such as its speed, or the load applied to it.

What is claimed is:

1. In a vehicle having an alternator and a battery connected to the alternator, a method of regulating the excitation current in a rotor winding of the alternator, the alternator comprising: a stator; a rotor including said rotor winding, the stator comprising stator windings; and a rectifier bridge connected to the said stator windings for delivering a rectified output voltage to be regulated by the said method, the said rectified voltage having a waveform comprising a low frequency, variable amplitude, component produced by the said excitation current, whereby the said rectified voltage is a periodic voltage of period T, with each said period T consisting of a first phase and a second phase, the said first phase being a phase in which the voltage of the battery is applied to the stator winding, and the second phase being a phase in which application of the battery voltage to the stator winding is absent, wherein the said method includes the steps of:

measuring the rectified voltage by sampling;

performing a comparison between the measured value of the rectified voltage and a calculated reference value; and deducing from the said comparison first, second and third numerical values, wherein the said first numerical value corresponds to the difference between the measured value of the rectified voltage and the reference value, the said second numerical value being a closed loop excitation calculated, for each period T, by adding to the value of the closed loop excitation in the preceding period the said first numerical value, to which a first correcting factor is applied, and the said third numerical value being an open loop excitation which is calculated, in each period T, by adding to the value of the closed loop excitation previously calculated during the same period T the first numerical value, to which a second correcting factor is applied, the said third numerical value determining the time T$_1$ during which the battery voltage is applied to the rotor winding of the alternator.

2. A method of regulation according to claim 1, wherein the said second correcting value is a number higher than the first correcting value.

3. A method of regulation according to claim 1, including the further step of carrying out a test when the said second numerical value has been calculated, the said test being a comparison between the said first numerical value and the duration of the period T, and, if the first numerical value is equal to the duration of the period T, a further step defining the said third numerical value equal to the period T.

4. A method of regulation according to claim 1, wherein the said reference value is calculated as a function of at least one parameter associated with at least one of the alternator and the battery of the vehicle.

5. A method of regulation according to claim 4, wherein the said reference value is calculated as a function of the temperature of at least one of the alternator and the battery of the vehicle.

6. A method of regulation according to claim 4, including the steps of: measuring temperature in the course of each period T; deducing therefrom a reference value which is a function of the measured temperature; and comparing the said reference value with the measured value of the rectified voltage.

7. A method of regulation according to claim 6, wherein the said reference value is calculated, from a value predetermined for a given temperature, by applying to the said predetermined value a correcting factor which is a function of the temperature.

8. A device for regulating the excitation current in the rotor winding of an alternator, adapted to perform the method of claim 1.

* * * * *